United States Patent
Bournes

(10) Patent No.: US 9,646,510 B2
(45) Date of Patent: May 9, 2017

(54) ICE-SKATE INSTRUCTIONAL KIT

(71) Applicant: Michelle Bournes, Evanston, IL (US)

(72) Inventor: Michelle Bournes, Evanston, IL (US)

(*) Notice: Subject to any disclaimer, the term of this patent is extended or adjusted under 35 U.S.C. 154(b) by 206 days.

(21) Appl. No.: 14/744,046

(22) Filed: Jun. 19, 2015

(65) Prior Publication Data

US 2015/0371552 A1    Dec. 24, 2015

Related U.S. Application Data

(60) Provisional application No. 62/016,076, filed on Jun. 23, 2014.

(51) Int. Cl.
| | | |
|---|---|---|
| *G09B 19/00* | (2006.01) | |
| *G09B 1/00* | (2006.01) | |
| *A43B 3/00* | (2006.01) | |
| *A43B 5/16* | (2006.01) | |
| *A43B 5/18* | (2006.01) | |

(52) U.S. Cl.
CPC ........ *G09B 19/0038* (2013.01); *A43B 3/0078* (2013.01); *A43B 5/16* (2013.01); *A43B 5/18* (2013.01); *G09B 1/00* (2013.01)

(58) Field of Classification Search
USPC ............ 434/247, 250, 255, 258, 260; 2/245; 36/101, 112, 115, 136, 77 R
See application file for complete search history.

(56) References Cited

U.S. PATENT DOCUMENTS

| | | | | |
|---|---|---|---|---|
| 2,068,946 | A * | 1/1937 | Ferguson ............... | A43B 23/20 36/1 |
| 4,288,930 | A * | 9/1981 | Bornell .................... | A43B 5/12 36/132 |
| 4,712,319 | A * | 12/1987 | Goria ................... | A43B 1/0036 359/518 |
| 4,766,682 | A * | 8/1988 | Malloy, III .......... | A43B 3/0078 36/132 |
| 4,978,304 | A * | 12/1990 | Alexander ......... | G09B 19/0076 36/136 |
| 5,269,690 | A * | 12/1993 | Zigon .................. | A43B 3/0078 36/112 |
| 5,372,510 | A * | 12/1994 | Stanfield ............ | G09B 19/0076 132/279 |
| 5,586,888 | A * | 12/1996 | Webb ................... | A43B 3/0078 36/112 |
| 5,611,692 | A * | 3/1997 | Gehrdes ............. | G09B 19/0076 434/260 |
| 6,746,249 | B1 * | 6/2004 | Claunch ............ | G09B 19/0076 434/260 |

(Continued)

*Primary Examiner* — Kurt Fernstrom
(74) *Attorney, Agent, or Firm* — Fraline J. Allgaier

(57) ABSTRACT

An ice-skate instructional kit is provided and comprises at least one pair of slip-on covers and stickers having directional words, directional symbols, gender identifying words and exchangeable decorations thereon. The top surface of the slip-on cover is adapted to cover the toecap of an ice-skate and is preferably formed of a flexible plastic material that is writeable, erasable and is adapted to receive a plurality of stickers. In a preferred embodiment of the invention, the slip-on cover is secured in place by placing a first confronting flap atop a second confronting flap and further securing the flaps in place by adhesive members attached thereon. In a second embodiment of the invention, small securing clips and large securing clips can be used to hold the slip-on covers in place.

19 Claims, 4 Drawing Sheets

(56) References Cited

U.S. PATENT DOCUMENTS

| | | | | |
|---|---|---|---|---|
| 7,004,892 B2* | 2/2006 | Marco | ............... | A63B 21/0004 |
| | | | | 434/258 |
| 2006/0211522 A1* | 9/2006 | Hapanowicz | ...... | A63B 69/0002 |
| | | | | 473/452 |
| 2007/0130805 A1* | 6/2007 | Brady | ................. | A43B 3/0078 |
| | | | | 36/136 |
| 2009/0077832 A1* | 3/2009 | Flint | ....................... | A43B 5/02 |
| | | | | 36/133 |
| 2009/0100714 A1* | 4/2009 | Coger | ................. | A43B 1/0081 |
| | | | | 36/100 |
| 2010/0223814 A1* | 9/2010 | Ignacio | ................... | A43B 3/16 |
| | | | | 36/136 |
| 2013/0263479 A1* | 10/2013 | Mickey | ................. | A43B 23/24 |
| | | | | 36/136 |
| 2015/0196093 A1* | 7/2015 | Knutson | ................. | A43B 7/02 |
| | | | | 36/72 R |
| 2015/0230557 A1* | 8/2015 | Jackson | ................ | A43B 23/24 |
| | | | | 206/223 |

\* cited by examiner

ICE-SKATE INSTRUCTIONAL KIT

RELATED APPLICATIONS

The present application claims the benefit under 35 USC 120 of U.S. Provisional Application No. 62016076 filed on Jun. 23, 2014 in the name of Michelle Bournes and entitled "Ice-skate Decorating Kit".

BACKGROUND OF THE INVENTION

The present invention relates to an ice-skate instructional kit that includes at least one pair of slip-on covers for the front of ice-skates and sticker members with instructional indicia for placing thereon. Embodiments of this invention also include slip-on covers that can be clipped on the ice-skates and that can be held in place by a plurality of securing clips.

Left-right confusion refers to the difficulty that a young person might have when learning to distinguish the left and right directions. This confusion is commonplace and can be a particular challenge for children who are learning how to ice-skate. Left-right confusion may be related to certain learning and attention deficits. For some children, learning left from right is a persistent problem that sometimes becomes a daily struggle. Research also shows that left-right confusion affects approximately 15% of the United States population.

Children and young adults ice-skate for a variety of reasons including for exercise or leisure. This can be done on outdoor or indoor tracks that are specially prepared or on frozen lakes and rivers. This inventive concept can assist children and adults to develop quicker symmetry judgments. This improvement can occur after repetitive use and during ice-skating.

Another desirable feature of this invention is the manner in which the stickers can be repeatedly used to decorate the ice-skates. People and society have become more conscious of the need to decorate various types of footwear. Various models of shoe covers and stickers have been developed to either protect or decorate an ice-skate. The slip-on covers and stickers can be created in a variety of shapes and sizes beyond those that have been presented herein. For example, the stickers can have directional words, directional symbols and gender identifying words for instructional use, for decorating the ice-skates and to further assist a child to learn left from right.

There has been continuous need for improvements in footwear based on the needs of the industry or the user. For example, conventional shoe decorations or covers do not help identify a user's shoe or help in distinguishing left from right. Often, there is a lack in variety and the shoe covers do not offer instructional benefits.

To this end, the ice-skate instructional kit of the present invention seeks to put a system in place to facilitate left-right distinction during ice-skate instruction, help a user distinguish the left ice-skate from the right, decorate an ice-skate and further personalize its front area.

The design of the slip-on cover will also be suitable and effective for ice-skaters. The functionality will include an improved way to decorate skates. The user simply places a slip-on cover on the skate and decorates it using a plurality of stickers having directional words, directional symbols and gender identifying words for decorating the ice-skates.

A user could easily identify his or her ice-skate based on the color chosen for the slip-on cover and the personal and instructional messages placed thereon. The slip-on cover is quickly removable and the user can replace the slip-on covers with a new or existing cover. The slip-on cover can also be wiped off in preparation for a separate set of stickers.

Accordingly, it would be advantageous to provide an ice-skate instructional kit that integrates at least one pair of slip-on covers and replaceable instructional elements. This kit would help children express their creativity and help them learn left from right. It would greatly reduce the risks of slips and falls due to wearing skates on the wrong foot and the frustration of putting on boots and taking them off. It would also be used as a tool to help ice-staking coaches to instruct students; especially since being able to distinguish left from right is pivotal to a successful learning experience. Even more importantly, the slip-on cover provides skaters with special needs the opportunity to take part in skating lessons by providing a color-coded and multi-directional way to distinguish left from right.

SUMMARY OF THE INVENTION

It is therefore an objective of the present invention to address the above concerns and to provide an ice-skate instructional kit as described above, and specifically to provide for an ice-skate instructional kit that can decorate an ice-skate and is inexpensive to manufacture.

Another objective of the present invention is to provide an ice-skate instructional kit to personalize an ice-skate using at least one pair of slip-on covers and a plurality of instructional stickers.

Another objective of the present invention is to provide an ice-skate instructional kit to help a user identify the left ice-skate from the right ice-skate using slip-on covers of various colors and stickers that can help identify the ice-skate.

Still another objective of the present invention is to improve the skating ability of a user and to provide a tool for coaches to help students distinguish the left ice-skate from the right and further enable them to move in the left or the right direction. For example, the present invention could be of particular importance to special needs students who might have trouble distinguishing left from right.

In accordance with the present invention, there is provided an ice-skate instructional kit which includes a slip-on cover for the front of an ice-skate and stickers for instructional and decorative use of the slip-on cover.

Drawings, which form a part of this specification, show various embodiments for the slip-on cover and a plurality of exchangeable stickers having directional words, directional symbols and gender identifying words for instructional or decorative use.

The slip-on cover has confronting bottom flaps that engage at the bottom of the ice-skate and can be adjusted to secure the slip-on cover to the ice-skate. The confronting bottom flaps engage to follow the outline of the side of the ice-skate and cover the front sole.

The slip-on covers can be made from a plastic material that is adapted to be secured to the ice-skate. In addition, the slip-on cover can be transparent in order to further enhance a desired decorative effect. The slip-on cover can be molded to identify the right or left ice-skate. The slip-on cover can also be made in various colors or sizes and can be adapted to fit various types of ice-skates. For example, the slip-on covers can be made to glow in the dark and can be manufactured to include different colors for the left and the right ice-skates.

Additional advantages and features of the present invention will become more apparent when considered in light of the drawings.

DETAILED DESCRIPTION OF THE INVENTION

The detailed description is for illustrative purposes and does not limit the scope of the present invention. The embodiments described below provide sufficient information to enable a person having ordinary skill in the art to practice the invention. It should be understood that other embodiments can be practiced with multiple variations without departing from the scope of the invention.

Figure 1:
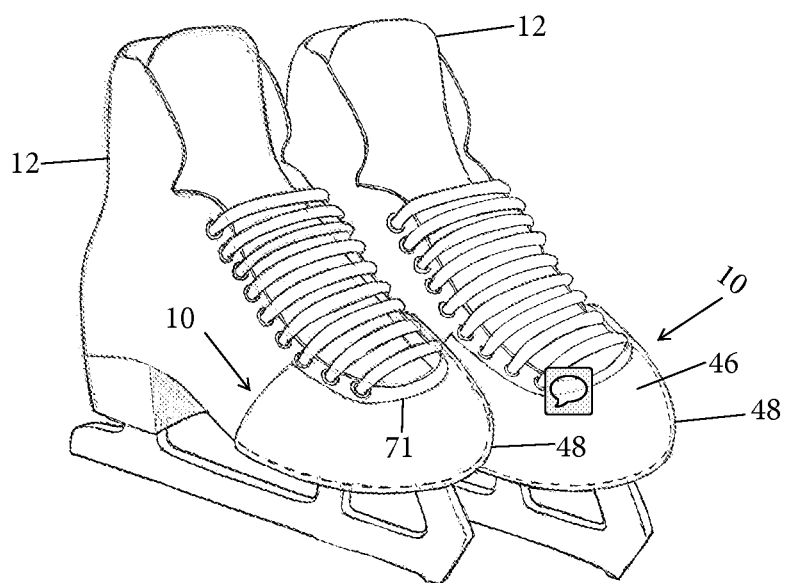
FIG. 1 is a perspective view of a first embodiment of the slip-on cover in accordance with the present invention.

Referring now to the drawings, FIG. 1 shows the preferred embodiment of the slip-on cover 10 being used on ice-skates 12. The slip-on cover 10 is generally indicated by the numeral 10.

The ice-skate instructional kit of the present invention features at least one pair of slip-on covers 10 for the toecap 22 of an ice-skate 12 and stickers 20 to help users determine left from right and to further decorate the ice-skates. The slip-on cover 10 has a top surface 46, an outer rim 48, and a bottom side 14. The bottom side 14 has a first confronting flap 16 and a second confronting flap 18. The first confronting flap 16 and the second confronting flap 18 of the slip-on covers 10 are secured by an adhesive material 44 that secures the inner meeting edge of the first confronting flap 24 and the inner meeting edge of the second confronting flap 26. The second confronting flap 18 has an opening 28 that allows the user to peel back the second confronting flap 18 and remove the slip-on cover 10 from the ice-skate 12. The adhesive material 44 is adapted to attach said first confronting flap 16 to the second confronting flap 18.

Figure 2:
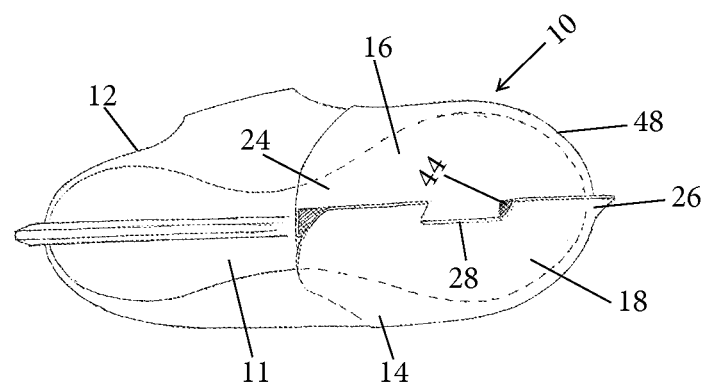
FIG. 2 is a bottom view of the slip-on cover in accordance with the present invention showing the confronting flaps.
Figure 3:
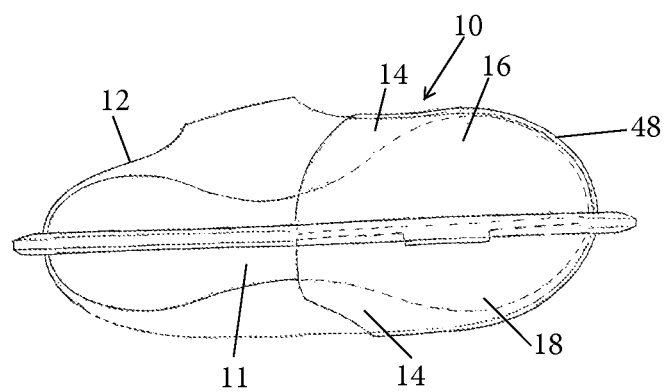
FIG. 3 is a bottom view of the slip-on cover showing the slip-on cover being engaged with the bottom of the ice-skate.

FIG. 2 and FIG. 3 show the slip-on cover 10 being engaged with the bottom 11 of an ice-skate 12. A first confronting flap 16 engages with a second confronting flap 18 in order to secure the slip-on cover 10 in place during use. The first confronting flap 16 and the second confronting flap 18 engage to follow the outline of the outer rim 48 of the ice-skates 12 and to substantially cover the toecap 22 of the ice-skate 12. The slip-on covers 10 are flexible and are manipulated in order to place said second confronting flap 18 atop said first confronting flap 16. The slip-on covers 10 can be constructed from a flexible plastic material and are adapted to fit the toecap 22 of an ice-skate 12. The plastic material can be clear to further highlight the decorative imagery and design produced by stickers 20.

The slip-on covers 10 are adapted to receive the stickers 20 and can have a writable top surface 46. Written personal messages can be placed on the slip-on covers 10 based on the user's preference and to further function as an instructional aid.

The slip-on covers 10 are adapted to fit various types of ice-skates 12 and can be washed and reused. Each set of slip-on covers 10 can be produced in various colors or can be produced in a single color used to distinguish left from right. The final production color can be a glow in the dark color thereby making the slip-on cover 10 visible at night-time or in a dark place. Dark places can include darkened skating facilities or outdoor skating rinks that are usable at night. The slip-on cover 10 is easy to manufacture and can be produced in various sizes.

Figure 4:
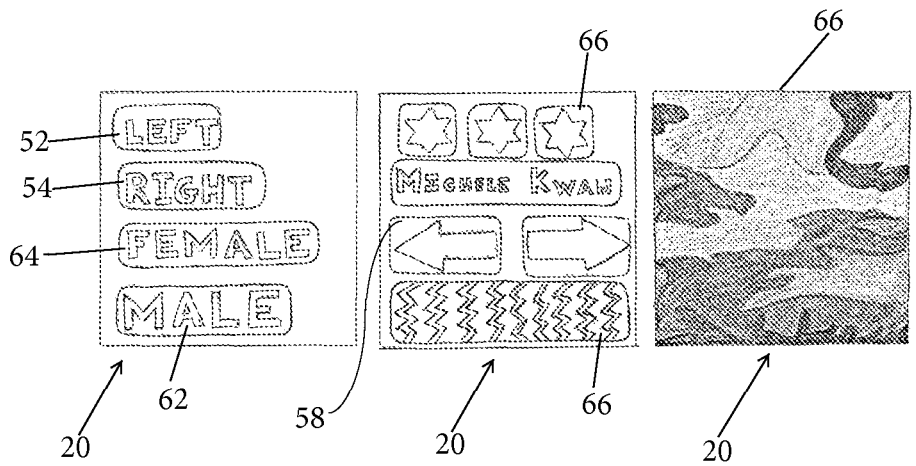
FIG. 4 shows a plurality of stickers that are used to decorate the slip-on cover.

FIG. 4 shows the sets of stickers 20 for instructional and decorative use of the ice-skates 10. The stickers 20 can have the directional words left 52 and right 54, directional symbols 58, the gender identifying words male 62 and female 64 and exchangeable decorative elements 66.

The stickers 20 are adapted to be securely adhered to the top surface 46 of the slip-on covers 10. In use, the stickers 20 can be applied to the slip-on cover 10 and allow a person to decorate the ice-skate 12 or to help distinguish left from right. The slip-on covers 10 are adapted to receive additional decorative elements such as tattoos and adhesive jewelry that can be attached and readily replaced.

Figure 5:
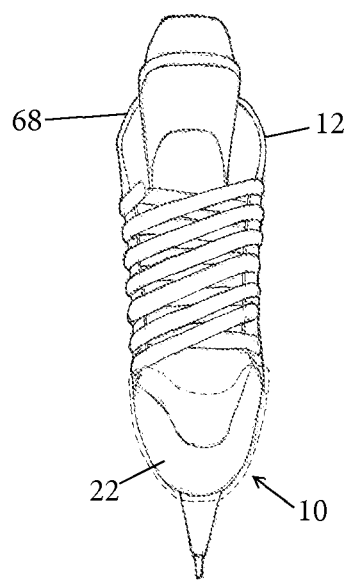
FIG. 5 is a perspective view of the slip-on covers in accordance with the present invention being used on a different type of ice-skate.

FIG. 5 shows another embodiment of the slip-on cover 10 which can be used for various types of ice-skates 12. For example, the slip-on cover 10 can be used to accessorize recreational ice-skates 68 which feature lacings in higher or lower positions. In addition, the slip-on cover 10 can be made to accessorize racing, hockey or additional types of ice-skates.

Figure 6:
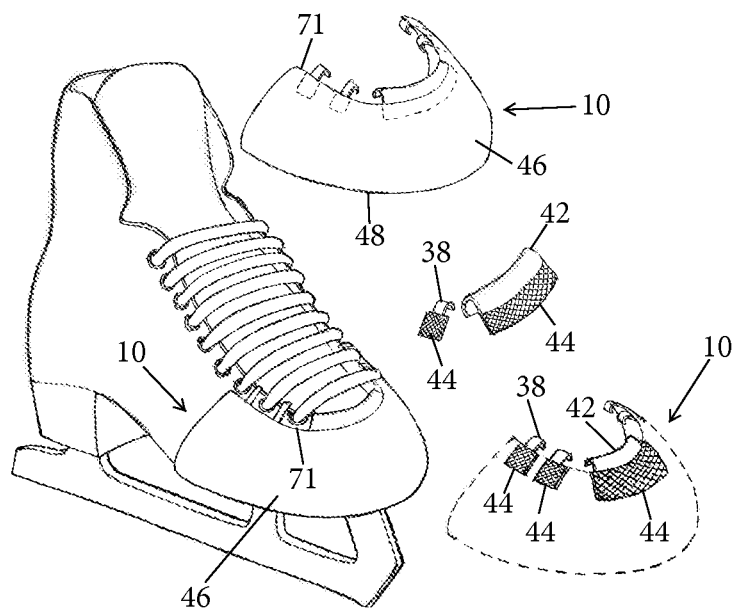
FIG. 6 is a perspective view of the large and small securing clips being attached to the ice-skate in order to keep the slip-on cover in place.

FIG. 6 shows another embodiment of the slip-on cover 30 which can be secured to the top rim 71 of the ice-skate 12 by using a plurality of small securing clips 38 and large securing clips 42. The small securing clips 38 and large securing clips 42 hold the slip-on covers 10 in place and in a desired position before skating. The small securing clips 38 and the large securing clips 42 can be attached to the top rim 71 of the slip-on cover 10 using an adhesive material 44.

What is claimed is:

1. An ice-skate instructional kit comprising:
   a. at least one pair of slip-on covers for the front of an ice-skate, said slip-on covers having a top surface, an outer rim, and a bottom side, said bottom side having a first confronting flap and a second confronting flap, said first and second confronting flaps comprising inner meeting edges, said first confronting flap and said second confronting flap of said slip-on covers are secured by an adhesive material that secures the inner meeting edges of said first confronting flaps and said second confronting flaps, said second confronting flaps having an opening that allows the user to peel back said second confronting flap and remove said slip-on cover from said ice-skate, said adhesive material is adapted to attach said first confronting flap to said second confronting flap and to secure said slip-on cover in place atop said ice-skate, and
   b. stickers for instructional use, said stickers having a plurality of decorations, said stickers being adapted to be securely adhered to the top surface of said slip-on covers.

2. The decorative kit of claim 1 wherein said slip-on covers are flexible to allow said slip-on covers to be manipulated and to place said second confronting flap atop said first confronting flap.

3. The decorative kit of claim 1 wherein said slip-on covers are adapted to fit the toecap of said ice-skate.

4. The decorative kit of claim 1 wherein said slip-on covers are constructed from a plastic material.

5. The decorative kit of claim 1 wherein said-slip on covers are adapted to receive said stickers.

6. The decorative kit of claim 1 wherein said slip-on covers are adapted to be a writeable surface.

7. The decorative kit of claim 1 wherein said slip-on covers are adapted to be an erasable surface.

8. The decorative kit of claim 1 wherein said slip-on covers are adapted to receive written personal messages thereon.

9. The decorative kit of claim 1 wherein said slip-on covers are adapted to fit various types of ice-skates.

10. The decorative kit of claim 1 wherein said slip-on covers are adapted to be washed and reused.

11. The decorative kit of claim 1 wherein said slip-on covers are produced in various colors.

12. The decorative kit of claim 1 wherein each slip-on cover is produced in a single color used to distinguish left from right.

13. The decorative kit of claim 1 wherein said slip-on covers are produced in various sizes.

14. The decorative kit of claim 1 wherein said slip-on covers are adapted to be visible in a dark place.

15. The decorative kit of claim 1 wherein said stickers have the words left and right written thereon.

16. The decorative kit of claim 1 wherein said stickers have arrows to further provide direction and help an individual distinguish left from right.

17. The decorative kit of claim 1 wherein said stickers have directional words to further help an individual distinguish left from right.

18. The ice-skate instructional kit as claimed in claim 1 wherein said ice-skate instructional kit is adapted to include additional decorative elements.

19. The ice-skate instructional kit as claimed in claim 1 wherein said slip-on covers comprise a plurality of large securing clips and small securing clips being placed along the top rim of said slip-on cover.

* * * * *